(12) United States Patent
Hagmar et al.

(10) Patent No.: US 11,263,263 B2
(45) Date of Patent: Mar. 1, 2022

(54) DATA PROPAGATION AND MAPPING SYSTEM

(71) Applicant: Palantir Technologies Inc., Palo Alto, CA (US)

(72) Inventors: Magnus Hagmar, Copenhagen (DK); Mads Poerksen Buch, Copenhagen (DK)

(73) Assignee: Palantir Technologies Inc., Denver, CO (US)

( * ) Notice: Subject to any disclaimer, the term of this patent is extended or adjusted under 35 U.S.C. 154(b) by 32 days.

(21) Appl. No.: 16/118,261

(22) Filed: Aug. 30, 2018

(65) Prior Publication Data

US 2019/0370409 A1 Dec. 5, 2019

Related U.S. Application Data

(60) Provisional application No. 62/678,127, filed on May 30, 2018.

(51) Int. Cl.
*G06F 17/30* (2006.01)
*G06F 16/901* (2019.01)
(Continued)

(52) U.S. Cl.
CPC ...... *G06F 16/9024* (2019.01); *G06F 16/2282* (2019.01); *G06F 16/258* (2019.01); *G06F 16/288* (2019.01)

(58) Field of Classification Search
CPC ......... G06F 17/30958; G06F 17/30339; G06F 17/30569; G06F 17/30604
See application file for complete search history.

(56) References Cited

U.S. PATENT DOCUMENTS 5,418,950 A  5/1995  Li et al.
5,428,737 A  6/1995  Li et al.
(Continued)

FOREIGN PATENT DOCUMENTS

DE  102014103482  9/2014
EP  1647908  4/2006
(Continued)

OTHER PUBLICATIONS

Notice of Allowance for U.S. Appl. No. 15/292,078 dated Mar. 28, 2019.
(Continued)

*Primary Examiner* — Hosain T Alam
*Assistant Examiner* — Chongsuh Park
(74) *Attorney, Agent, or Firm* — Knobbe, Martens, Olson & Bear, LLP

(57) ABSTRACT

Systems and methods for data propagation and mapping are provided. In an aspect, one or more data entries storing changed information in a first database using a first storage format are identified. The identified data entries are received by the data propagation and mapping system. The received data entries may be filtered to generate a subset of filtered data entries. The filtered data entries are transmitted to a mapping pipeline configured to map a data entry stored in the first storage format to a data entry stored in a second storage format. The mapped data entries are transmitted to a recipient second database storing data entries using the second storage format.

16 Claims, 10 Drawing Sheets

(51) Int. Cl.
*G06F 16/22* (2019.01)
*G06F 16/25* (2019.01)
*G06F 16/28* (2019.01)

(56) References Cited

U.S. PATENT DOCUMENTS

| | | | |
|---|---|---|---|
| 5,428,776 | A | 6/1995 | Rothfield |
| 5,542,089 | A | 7/1996 | Lindsay et al. |
| 5,608,899 | A | 3/1997 | Li et al. |
| 5,613,105 | A | 3/1997 | Xbikowski et al. |
| 5,701,456 | A | 12/1997 | Jacopi et al. |
| 5,724,575 | A | 3/1998 | Hoover et al. |
| 5,794,228 | A | 8/1998 | French et al. |
| 5,794,229 | A | 8/1998 | French et al. |
| 5,857,329 | A | 1/1999 | Bingham |
| 5,911,138 | A | 6/1999 | Li et al. |
| 5,918,225 | A | 6/1999 | White et al. |
| 6,029,178 | A | 2/2000 | Martin et al. |
| 6,208,985 | B1 | 3/2001 | Krehel |
| 6,236,994 | B1 | 5/2001 | Swartz et al. |
| 6,279,015 | B1 | 8/2001 | Fong et al. |
| 6,289,334 | B1 | 9/2001 | Reiner et al. |
| 6,311,181 | B1 | 10/2001 | Lee et al. |
| 6,321,274 | B1 | 11/2001 | Shakib et al. |
| 6,604,100 | B1 | 8/2003 | Fernandez et al. |
| 6,643,613 | B2 | 11/2003 | McGee et al. |
| 6,701,352 | B1 | 3/2004 | Gardner et al. |
| 6,718,336 | B1 | 4/2004 | Saffer et al. |
| 6,745,382 | B1 | 6/2004 | Zothner |
| 6,795,868 | B1* | 9/2004 | Dingman .............. G06F 16/258 709/246 |
| 6,851,108 | B1 | 2/2005 | Syme et al. |
| 6,857,120 | B1 | 2/2005 | Arnold et al. |
| 6,877,137 | B1 | 4/2005 | Rivette et al. |
| 6,968,329 | B1 | 11/2005 | Chung et al. |
| 6,976,024 | B1 | 12/2005 | Chavez et al. |
| 6,996,589 | B1* | 2/2006 | Jayaram ............... G06F 16/258 |
| 7,028,223 | B1 | 4/2006 | Kolawa et al. |
| 7,085,890 | B2 | 8/2006 | Kashyap |
| 7,155,728 | B1 | 12/2006 | Prabhu et al. |
| 7,216,133 | B2 | 5/2007 | Wu et al. |
| 7,406,592 | B1 | 7/2008 | Polyudov |
| 7,519,589 | B2 | 4/2009 | Charnock et al. |
| 7,546,353 | B2 | 6/2009 | Hesselink et al. |
| 7,610,290 | B2 | 10/2009 | Kruy et al. |
| 7,627,489 | B2 | 12/2009 | Schaeffer et al. |
| 7,668,963 | B1 | 2/2010 | Miner et al. |
| 7,707,230 | B1 | 4/2010 | Brenner |
| 7,783,679 | B2 | 8/2010 | Bley |
| 7,853,573 | B2 | 12/2010 | Warner et al. |
| 7,877,421 | B2 | 1/2011 | Berger et al. |
| 7,908,521 | B2 | 3/2011 | Sridharan et al. |
| 7,979,424 | B2 | 7/2011 | Dettinger et al. |
| 8,073,857 | B2 | 12/2011 | Sreekanth |
| 8,103,962 | B2 | 1/2012 | Embley et al. |
| 8,417,715 | B1 | 4/2013 | Bruckhaus et al. |
| 8,429,194 | B2 | 4/2013 | Aymeloglu et al. |
| 8,433,702 | B1 | 4/2013 | Carrino et al. |
| 8,499,287 | B2 | 7/2013 | Shafi et al. |
| 8,560,494 | B1 | 10/2013 | Downing |
| 8,639,552 | B1 | 1/2014 | Chen et al. |
| 8,688,749 | B1 | 4/2014 | Ducott, III et al. |
| 8,788,931 | B1 | 7/2014 | Chen et al. |
| 8,788,935 | B1 | 7/2014 | Hirsch et al. |
| 8,799,867 | B1 | 8/2014 | Peri-Glass et al. |
| 8,909,597 | B2 | 12/2014 | Aymeloglu et al. |
| 8,924,429 | B1 | 12/2014 | Fisher et al. |
| 8,935,201 | B1 | 1/2015 | Fisher et al. |
| 9,031,981 | B1 | 5/2015 | Potter et al. |
| 9,105,000 | B1 | 8/2015 | White et al. |
| 9,292,388 | B2 | 3/2016 | Fisher et al. |
| 9,330,120 | B2 | 5/2016 | Colgrove et al. |
| 9,348,677 | B2 | 5/2016 | Marinelli, III et al. |
| 9,378,526 | B2 | 6/2016 | Sampson |
| 9,514,205 | B1 | 12/2016 | Yazicioglu et al. |
| 9,563,555 | B2* | 2/2017 | Flynn .................... G11C 16/26 |
| 9,922,108 | B1 | 3/2018 | Meiklejohn et al. |
| 9,946,776 | B1 | 4/2018 | Yazicioglu et al. |
| 9,946,777 | B1 | 4/2018 | Ossher et al. |
| 2002/0087744 | A1 | 7/2002 | Kitchin |
| 2002/0124005 | A1 | 9/2002 | Matson et al. |
| 2002/0184111 | A1 | 12/2002 | Swanson |
| 2003/0004770 | A1 | 1/2003 | Miller et al. |
| 2003/0023620 | A1 | 1/2003 | Trotta |
| 2003/0105833 | A1 | 6/2003 | Daniels |
| 2003/0110297 | A1 | 6/2003 | Tabatabai et al. |
| 2003/0120665 | A1 | 6/2003 | Fox et al. |
| 2003/0212670 | A1 | 11/2003 | Yalamanchi et al. |
| 2004/0088177 | A1 | 5/2004 | Travis et al. |
| 2004/0098731 | A1 | 5/2004 | Demsey et al. |
| 2004/0103088 | A1 | 5/2004 | Cragun et al. |
| 2004/0117386 | A1 | 6/2004 | Lavender et al. |
| 2004/0126840 | A1 | 7/2004 | Cheng et al. |
| 2004/0132592 | A1 | 7/2004 | Yu |
| 2004/0139212 | A1 | 7/2004 | Mukherjee et al. |
| 2004/0153837 | A1 | 8/2004 | Preston et al. |
| 2004/0172592 | A1 | 9/2004 | Collie et al. |
| 2004/0193608 | A1 | 9/2004 | Gollapudi et al. |
| 2004/0236796 | A1 | 11/2004 | Bhatt et al. |
| 2004/0254658 | A1 | 12/2004 | Sherriff et al. |
| 2004/0260702 | A1 | 12/2004 | Cragun et al. |
| 2005/0004911 | A1 | 1/2005 | Goldberg et al. |
| 2005/0021397 | A1 | 1/2005 | Cui et al. |
| 2005/0022111 | A1 | 1/2005 | Collet et al. |
| 2005/0120080 | A1 | 6/2005 | Weinreb et al. |
| 2005/0183005 | A1 | 8/2005 | Denoue et al. |
| 2005/0223413 | A1 | 10/2005 | Duggan et al. |
| 2005/0226473 | A1 | 10/2005 | Ramesh |
| 2005/0257125 | A1 | 11/2005 | Roesner et al. |
| 2005/0278286 | A1 | 12/2005 | Djugash et al. |
| 2006/0004740 | A1 | 1/2006 | Dettinger et al. |
| 2006/0047717 | A1 | 3/2006 | Pereira |
| 2006/0048140 | A1 | 3/2006 | Boctor et al. |
| 2006/0070046 | A1 | 3/2006 | Balakrishnan et al. |
| 2006/0074967 | A1 | 4/2006 | Shaburov |
| 2006/0080616 | A1 | 4/2006 | Vogel et al. |
| 2006/0116991 | A1 | 6/2006 | Calderwood |
| 2006/0129992 | A1 | 6/2006 | Oberholtzer et al. |
| 2006/0142949 | A1 | 6/2006 | Helt |
| 2006/0143521 | A1 | 6/2006 | Lang |
| 2006/0167909 | A1 | 7/2006 | Mendis et al. |
| 2006/0209085 | A1 | 9/2006 | Wong et al. |
| 2006/0236307 | A1 | 10/2006 | Debruin et al. |
| 2006/0271838 | A1 | 11/2006 | Carro |
| 2006/0271884 | A1 | 11/2006 | Hurst |
| 2006/0288046 | A1 | 12/2006 | Gupta et al. |
| 2007/0005582 | A1 | 1/2007 | Navratil et al. |
| 2007/0005635 | A1 | 1/2007 | Martinez et al. |
| 2007/0027851 | A1 | 2/2007 | Kruy et al. |
| 2007/0094248 | A1 | 4/2007 | McVeigh et al. |
| 2007/0113164 | A1 | 5/2007 | Hansen et al. |
| 2007/0150805 | A1 | 6/2007 | Misovski |
| 2007/0168336 | A1 | 7/2007 | Ransil et al. |
| 2007/0178501 | A1 | 8/2007 | Rabinowitz et al. |
| 2007/0180439 | A1 | 8/2007 | Sundararajan et al. |
| 2007/0192281 | A1 | 8/2007 | Cradick et al. |
| 2007/0239762 | A1 | 10/2007 | Farahbod |
| 2007/0260582 | A1 | 11/2007 | Liang |
| 2008/0114797 | A1 | 5/2008 | Jones et al. |
| 2008/0114997 | A1 | 5/2008 | Chin |
| 2008/0126344 | A1 | 5/2008 | Hoffman et al. |
| 2008/0126402 | A1 | 5/2008 | Sikchi et al. |
| 2008/0126951 | A1 | 5/2008 | Sood et al. |
| 2008/0127171 | A1 | 5/2008 | Tarassov |
| 2008/0155440 | A1 | 6/2008 | Trevor et al. |
| 2008/0196016 | A1 | 8/2008 | Todd |
| 2008/0201313 | A1 | 8/2008 | Dettinger et al. |
| 2008/0209413 | A1 | 8/2008 | Kakumani et al. |
| 2008/0215543 | A1 | 9/2008 | Huang et al. |
| 2008/0267386 | A1 | 10/2008 | Cooper |
| 2008/0270950 | A1 | 10/2008 | Whitehead et al. |
| 2008/0306981 | A1 | 12/2008 | Jiang et al. |
| 2009/0006150 | A1 | 1/2009 | Prigge et al. |
| 2009/0006610 | A1 | 1/2009 | Venable |

(56) References Cited

U.S. PATENT DOCUMENTS

| | | |
|---|---|---|
| 2009/0007056 A1 | 1/2009 | Prigge et al. |
| 2009/0024639 A1 | 1/2009 | Steinmann |
| 2009/0043762 A1 | 2/2009 | Shiverick et al. |
| 2009/0055487 A1 | 2/2009 | Moraes et al. |
| 2009/0070757 A1 | 3/2009 | Bak et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2009/0300482 A1 | 12/2009 | Summers et al. |
| 2010/0011282 A1 | 1/2010 | Dollard et al. |
| 2010/0049729 A1 | 2/2010 | Black |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0082706 A1 | 4/2010 | Lim |
| 2010/0121890 A1* | 5/2010 | Perkins ................. G06F 16/90 707/805 |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0035667 A1 | 2/2011 | Dittmer-Roche |
| 2011/0041084 A1 | 2/2011 | Karam |
| 2011/0054978 A1 | 3/2011 | Mohil |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0119583 A1 | 5/2011 | Gilley et al. |
| 2011/0131547 A1 | 6/2011 | Elaasar |
| 2011/0145401 A1 | 6/2011 | Westlake |
| 2011/0161916 A1 | 6/2011 | Thomson et al. |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0313982 A1 | 12/2011 | Kranendonk et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0117008 A1 | 5/2013 | Condie et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0262061 A1 | 10/2013 | Laake |
| 2013/0275383 A1 | 10/2013 | McLarty |
| 2014/0006216 A1 | 1/2014 | Malapati et al. |
| 2014/0012886 A1 | 1/2014 | Downing et al. |
| 2014/0025650 A1 | 1/2014 | Lee et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0156711 A1 | 6/2014 | Sharan et al. |
| 2014/0195891 A1 | 7/2014 | Rao et al. |
| 2014/0214579 A1 | 7/2014 | Shen et al. |
| 2014/0244388 A1 | 8/2014 | Manouchehri et al. |
| 2015/0026114 A1 | 1/2015 | Triff et al. |
| 2015/0100541 A1 | 4/2015 | Li et al. |
| 2015/0106685 A1 | 4/2015 | Gupta |
| 2015/0112641 A1 | 4/2015 | Faraj |
| 2015/0178342 A1* | 6/2015 | Seering ................. G06F 16/254 707/754 |
| 2015/0269030 A1 | 9/2015 | Fisher et al. |
| 2015/0373301 A1 | 12/2015 | Jacobs et al. |
| 2016/0026923 A1 | 1/2016 | Erenrich et al. |
| 2016/0062777 A1 | 3/2016 | Duffield et al. |
| 2016/0085764 A1 | 3/2016 | Sarkar et al. |
| 2016/0092475 A1 | 3/2016 | Stojanovic et al. |
| 2016/0092476 A1 | 3/2016 | Stojanovic et al. |
| 2016/0132495 A1 | 5/2016 | Ghatage et al. |
| 2016/0161621 A1 | 6/2016 | Salama et al. |
| 2016/0253391 A1* | 9/2016 | Burns ............... G06F 16/24564 707/722 |
| 2018/0089276 A1* | 3/2018 | Victor ................. G06F 16/258 |
| 2018/0210935 A1 | 7/2018 | Yazicioglu et al. |

FOREIGN PATENT DOCUMENTS

| | | |
|---|---|---|
| EP | 2634745 | 9/2013 |
| EP | 2743839 | 6/2014 |
| EP | 2778986 | 9/2014 |
| EP | 2921975 | 9/2015 |
| EP | 3185144 | 6/2017 |
| EP | 3575983 | 12/2019 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |
| WO | WO 2016/049460 | 3/2016 |
| WO | WO 2016/064771 | 4/2016 |

OTHER PUBLICATIONS

Notice of Allowance for U.S. Appl. No. 15/343,096 dated Apr. 12, 2018.

Official Communication for European Patent Application No. 19177291.2 dated Aug. 23, 2019.

Official Communication for U.S. Appl. No. 15/292,078 dated May 16, 2017.

Official Communication for U.S. Appl. No. 15/292,078 dated Nov. 8, 2017.

Official Communication for U.S. Appl. No. 15/343,096 dated Nov. 15, 2017.

Official Communication for U.S. Appl. No. 15/292,078 dated Apr. 27, 2018.

Official Communication for U.S. Appl. No. 16/053,437 dated Sep. 10, 2019.

"A Quick Guide to UniProtKB Swiss-Prot & TrEMBL," Sep. 2011, pp. 2.

"A Tour of Pinboard," <http://pinboard.in/tour> as printed May 15, 2014 in 6 pages.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb/843147 printed Dec. 18, 2006 in 5 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

(56) References Cited

OTHER PUBLICATIONS

Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
"The FASTA Program Package," fasta-36.3.4, Mar. 25, 2011, pp. 29.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Đ55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mcdonough, Michele, "How to Import CSV and Other Delimited Files into Microsoft Access 2007", Feb. 27, 2009 (Feb. 27, 2009), XP055410717, Retrieved from the Internet: URL:http://www.brighthub.com/computing/windows-platform/articles/27511.aspx 27511.aspx [retrieved on Sep. 27, 2017].
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÈAcitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
"This File Does Not Have a Program Associated with It—What Does This Mean and What do I do?—Ask Leo!", Apr. 18, 2015, retrieved on May 19, 2017 from https://web.archive.org/this_file_does_not_have_a_program_associated_with_it_what_does_this_mea n_and_what_do_i_do/.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.
Official Communication for European Patent Application No. 19177291.2 dated Sep. 10, 2021, 9 pages.

\* cited by examiner

DATA PROPAGATION AND MAPPING SYSTEM

TECHNICAL FIELD

The present disclosure relates to systems and techniques for adaptive and transparent entity screening. More specifically, the present disclosure relates to adaptive and transparent entity screening that may be configured to continuously reassess a match between pairs of entities in a way that is easily reviewable by a user.

BACKGROUND

Large data stores represent a vast collection of information that may be utilized or relied upon by programs, applications, or even other data stores. Often, valuable data or information is encoded in a specific format in a data store for efficient organization, storage, and retrieval (e.g., information may be organized and stored as tabular entries in a large spreadsheet). Because a data store may contain information that is used by another data store, a receiving data store must identify changes in information in a transmitting data store and update relevant data entries accordingly. However, because a data store may not recognize or identify received data in an incompatible storage format, there is a need to transform data from one storage format to one or more other storage formats and transmit the transformed data to the appropriate data stores.

SUMMARY

The systems, methods, and devices described herein each have several aspects, no single one of which is solely responsible for its desirable attributes. Without limiting the scope of this disclosure, several non-limiting features will now be discussed briefly.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

One aspect of the disclosure provides a system for data propagation and mapping. The system comprises a first non-transitory computer storage medium configured to store a data set representable in a first storage format, a second non-transitory computer storage medium configured to store a data set representable in a second storage format, a third non-transitory computer storage medium configured to at least store computer-executable instructions, and one or more computer hardware processors. The one or more computer hardware processors may be configured to execute the computer-executable instructions to at least identify, in the first non-transitory computer storage medium, one or more data entries storing changed information in a data set; filter the one or more identified data entries in the first non-transitory computer storage medium to generate a subset of filtered data entries, transmit the filtered data entry to a pipeline configured to map a data entry in the first storage format to a data entry in the second storage format, and transmit the mapped data entry to the second non-transitory computer storage medium.

DETAILED DESCRIPTION

Overview

Figure 1:
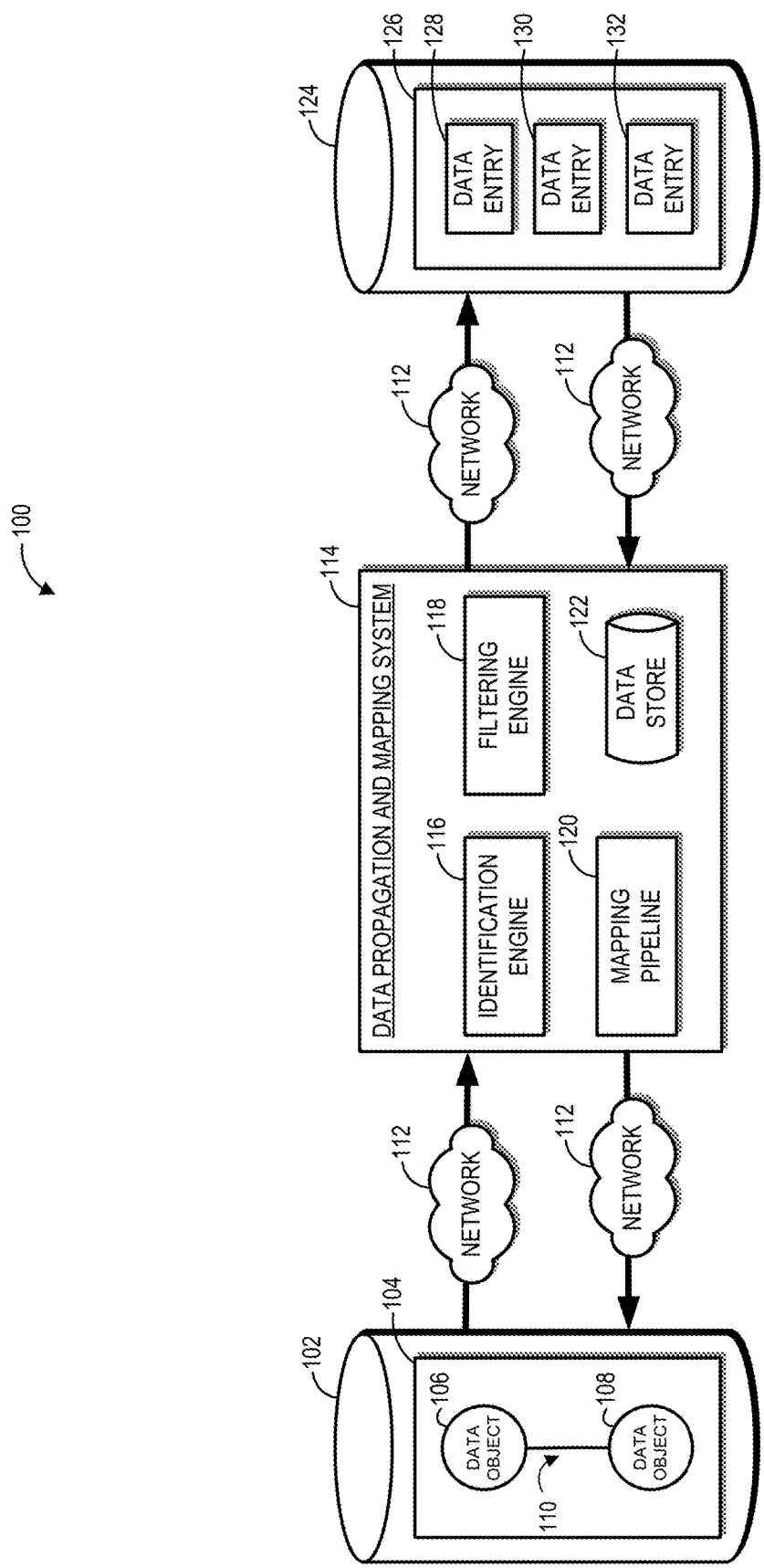
FIG. 1 is an overview of an example data propagation and mapping system.

For purposes of improving accuracy and reliability, it is advantageous that a change to information in one data store is propagated to other data stores that have or use similar information. However, because not all data stores use identical formatting, a data store may not be able to recognize or identify received data if the transmitting data store formats data differently than the receiving data store. Thus, examples of technical problems include identifying changes to a data set, propagating the changes in data to one or more recipients, mapping the propagated data from a first storage format to a second storage format, and transmitting the mapped data to the one or more recipients.

The data propagation and mapping system identifies data entries storing changed information in a first database using a first storage format and converts the data entries into a second storage format so that the changed data may be transmitted to and stored in a second database.

The system monitors one or more data sets in a first data store to identify data entries storing changed information. The system may, for example, periodically receive from a first database all data sets stored in the database. The system may then examine each data entry in all the received data sets to detect discrepancies between the received data entry and a previous version of the data entry. Because not all data entries from the first database may be relevant to the second database, data entries may be filtered according to properties such as data type, or object identifier.

The system may funnel data entries from the first database into a mapping pipeline to transform data stored in a first storage format into data stored in a second storage format. The mapping pipeline may comprise a number of blocks configured to execute the overall mapping process. For example, a receiving block may simply receive a data entry represented in a first storage format, a transformation block may identify properties in the data entry that are not found in the second storage format, strip the property from the data entry, and structure the data to match the second storage format, and an output block may output the data entry in the second storage format. The system may transmit the output of the mapping pipeline to the second database. Although some embodiments transform data entries using only one mapping pipeline, other examples may utilize different implementations. For example, an example system may pass data entries through multiple mapping pipelines in a chain to iterate multiple changes throughout the entire pipeline.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Entity: An individual, a group of individuals (e.g., a household of individuals, a married couple, etc.), a business, or other organization.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties (or "Attributes"): information about a data object, such as an entity, that represent the particular data object. Each attribute of a data object has a property type and a value or values. Entity properties, for example, may include name, address, postal code, IP address, username, phone number, etc.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Examples of Data Propagation and Mapping

FIG. 1 is an overview of an example data propagation and mapping system. The example system 100 may comprise a first database or data store 102, a data propagation and mapping system 114, and a second database or data store 124. In some embodiments, the database 102, data propagation and mapping system 114, and database 124 may be connected to each other over network 112. In some embodiments, network 112 may comprise the Internet, a local area network, a wide area network and/or a wireless network.

Database 102 may comprise a data set 104 storing data entries. In some embodiments, data set 104 may comprise a number of data objects 106 and 108. In some embodiments, data objects 106 and 108 may comprise the same type of information (e.g., names of people). In some embodiments, the data objects may comprise different types of information. By way of example, data object 106 may store the name of a person while data object 108 stores data related to a geographic landmark. Data set 104 may further comprise a link 110 connecting data objects 106 and 108 according to a shared data object property or relationship. By way of example, if data objects 106 and 108 represented employees in a business, link 110 may connect data objects 106 and 108 to represent the fact that the two employees are colleagues in the same business. Database 102 may be in communication with the data propagation and mapping system 114 via a network 112. For example, database 102 may transmit a copy of data set 104 over network 112 to the data propagation and mapping system 114.

Database 124 may comprise a data set 126 comprising a series of data entries 128, 130, and 132. Database 124 may store data entries 126, 130, 132 in a different storage format than in database 102. For example, while information may be stored as data objects connected by links in database 102, information may instead be stored as tabular entries in a spreadsheet format in database 124.

Data propagation and mapping system 114 may be configured to transform data from a first storage format to a second storage format and may comprise a number of component engines and data stores. In the example system of FIG. 1, data propagation and mapping system 114 comprises an identification engine 116, a filtering engine 118, a mapping pipeline 120, and a data store 122. In some embodiments, data store 122 may comprise a non-transitory computer readable storage medium configured to at least store computer-executable instructions used to execute the processes of the identification 116, filtering engine 118, and mapping pipeline 120.

The identification engine 116 may monitor database 102 for data entries storing changed information and may be configured to receive an entire data set or one or more data entries. In some embodiments, the identification engine may monitor database 102 by periodically transmitting a polling request to database 102. The identification engine 116 may then receive a response transmission from database 102 comprising all data entries in a data set or in multiple data sets. In some embodiments, the identification engine 116 may also determine which databases should receive the output of the data propagation and mapping system 114 by determining whether a particular data entry in data set 104 is linked to or used by a program, application, or other database. In some embodiments, the identification engine 116 may also determine the differences between the first storage format and a second storage format for subsequent use in the mapping pipeline 120.

The filtering engine 118 may filter the data entries received or identified by the identification engine 116 to generate a subset of filtered data entries. For example, if database 124 only stored data entries related to people, the filtering engine 118 may iterate through each data entry transmitted from database 102 and received by identification engine 116 to determine whether the data entry stores information relate to people. In some embodiments, the filtering may occur by examining the content of the data entry itself or by examining data entry properties. By way of example, the filtering engine 118 may filter data set 104 for people data entries by checking to see if data objects 106 or 108 store names of people or are associated with the data object property type "People." In some embodiments, filtering according to a data property or characteristic may be executed incrementally such that a filter based on a second data property is executed after a filter based on a first data property. The filtering engine 118 may then pass along the filtered data set to the mapping pipeline 120.

The mapping pipeline 120 may be configured to transform data entries stored in a first storage format into data entries stored in a second storage format. In some embodiments, the mapping pipeline may comprise multiple steps performed by multiple blocks. In some embodiments, the mapping pipeline may comprise a receiving block, a transformation block, and an output block. The receiving block may simply receive the filtered subset of data entries generated by the filtering engine 118 and pass each filtered data entry into the transformation block. The transformation block of the mapping pipeline may be configured to actually convert or transform the filtered data entry to match the storage format of a recipient program, application, or database. For example, database 102 may store information relating to a person called Mary Jane as data object 106 with associated data object properties corresponding to the person's age, ethnicity, age, marital status, etc. Database 124 may also store data entries of people, but may not track or store the data properties of ethnicity or age. The transformation block of the mapping pipeline may therefore delete the data properties ethnicity and age from the data entry. In addition to stripping information not stored or used by the second storage format, the transformation block may also format the filtered data entry itself to conform to format requirements of the second storage format. For example, the transformation block in mapping pipeline 120 may convert the data represented as linked data objects in database 102 to a series of tabulated entries stored in a spreadsheet in database and generate a mapped data entry that is compatible with a second storage format. In some embodiments, an output block of the mapping pipeline 120 may receive the mapped data entries from the transformation block and transmit the mapped data entries to the database 124 over network 112. In some embodiments, the mapping pipeline may receive a single data object from database 102 and output two or more data objects to be included in database 124.

Although the above discussion assumed data propagation and mapping from database 102 to database 124, in other embodiments the data propagation and mapping may instead flow from database 124 to database 102. Additionally, although some embodiments of the data propagation and mapping system transform data entries using only one mapping pipeline, other examples may utilize different implementations. For example, an example system may pass data entries through multiple mapping pipelines in a chain to iterate multiple changes throughout the entire pipeline.

Figure 2:
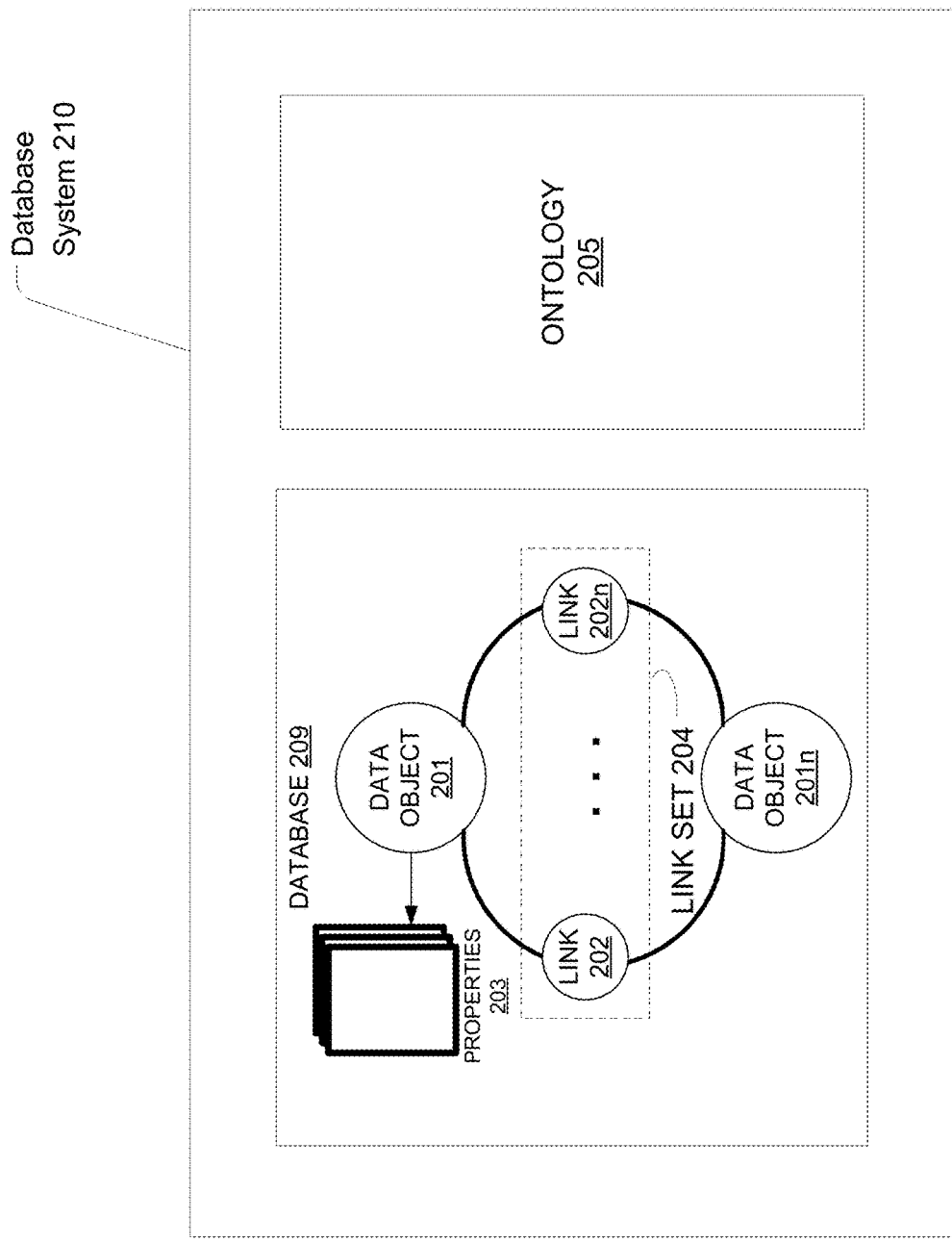
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
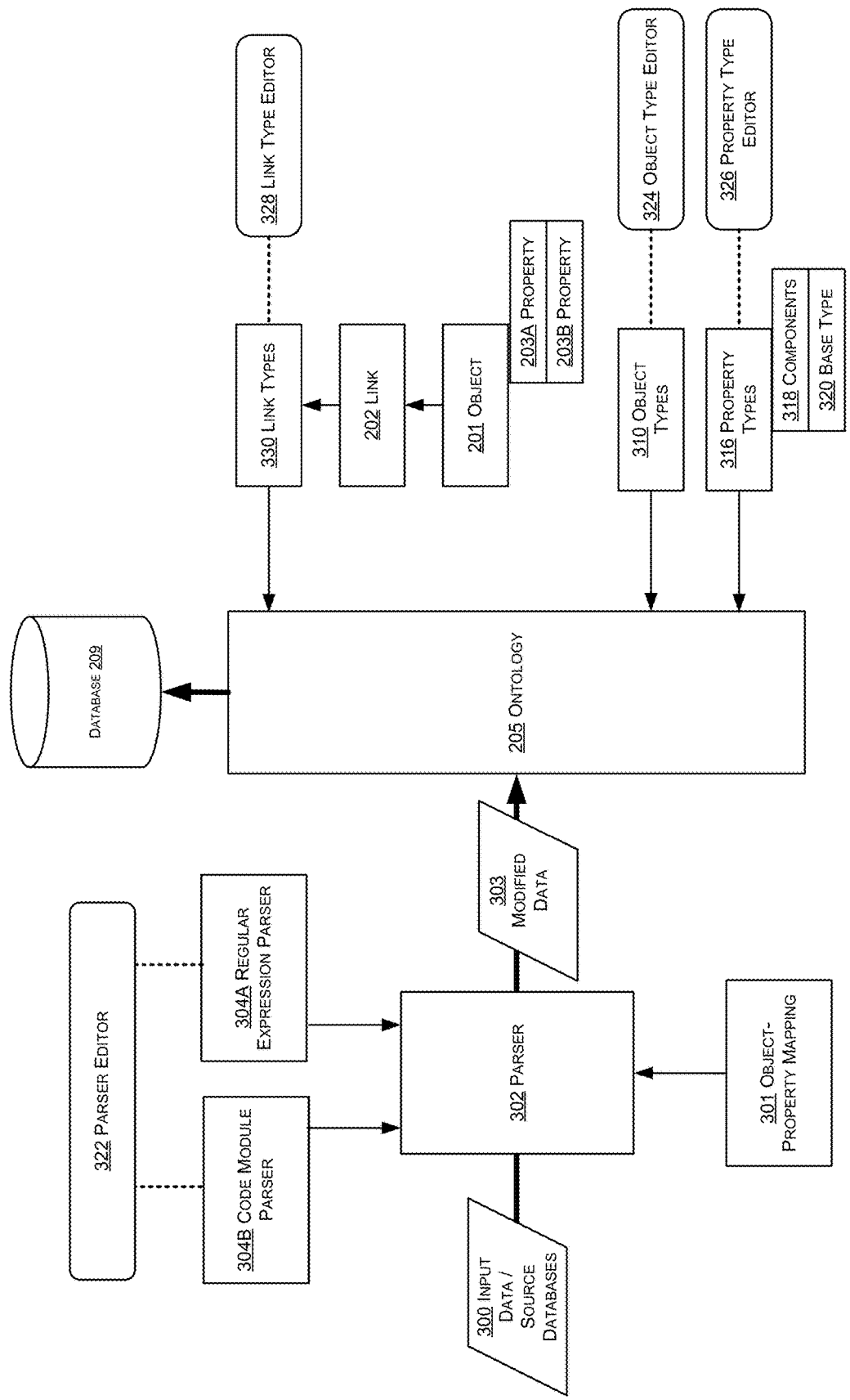
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Figure 4:
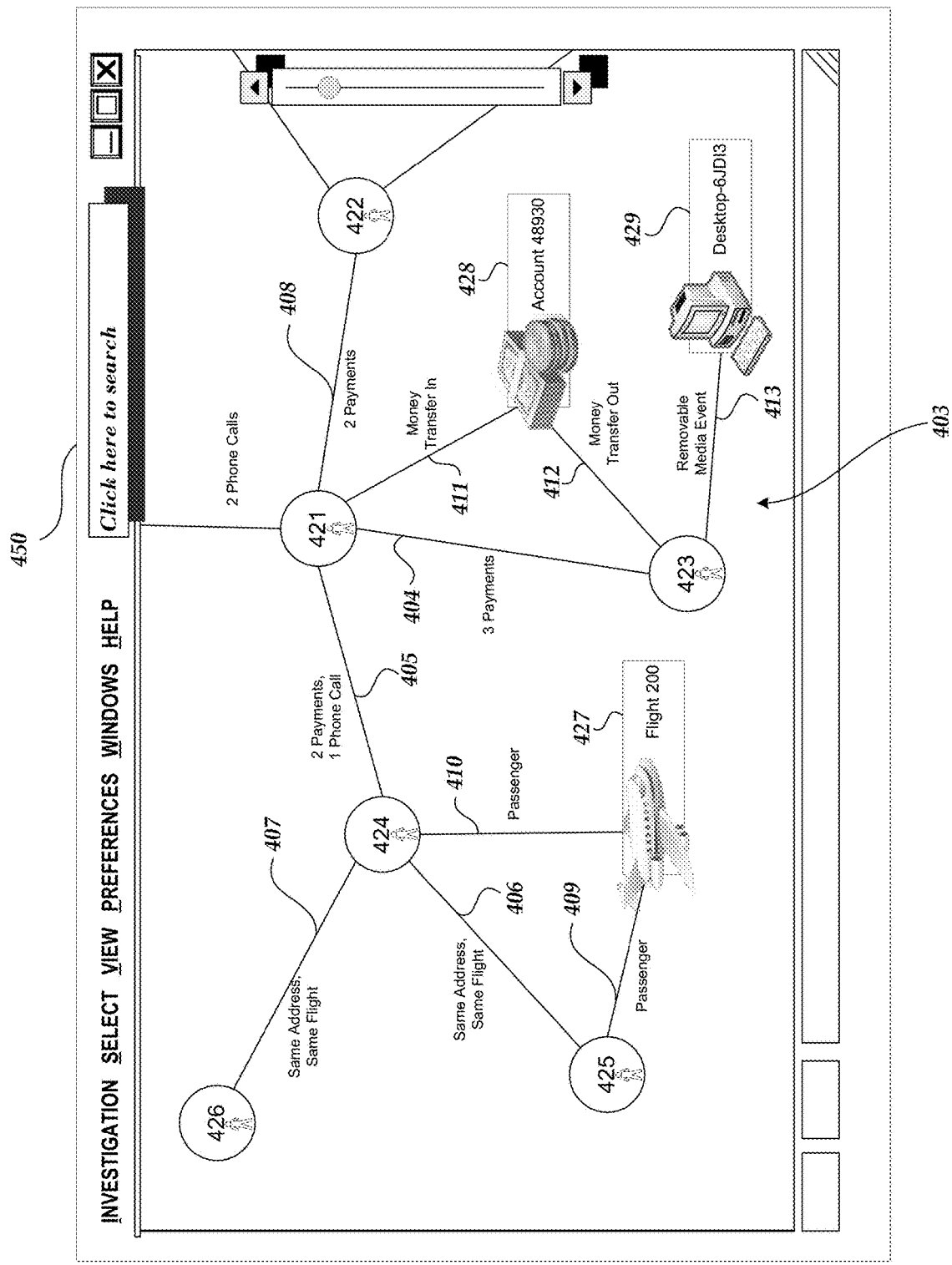
FIG. 4 illustrates a sample user interface using relationships described in a data store using a dynamic ontology.

For example, in FIG. 4, relationship 404 is based on a payment associated with the individuals indicated in person data objects 421 and 423. The link 404 represents these shared payments (for example, the individual associated with data object 421 may have paid the individual associated with data object 423 on three occasions). The relationship is further indicated by the common relationship between person data objects 421 and 423 and financial account data object 428. For example, link 411 indicates that person data object 421 transferred money into financial account data object 428, while person data object 423 transferred money out of financial account data object 428. In another example, the relationships between person data objects 424 and 425 and flight data object 427 are indicated by links 406, 409, and 410. In this example, person data objects 424 and 425 have a common address and were passengers on the same flight data object 427. In an embodiment, further details related to the relationships between the various objects may be displayed. For example, links 411 and 412 may, in some embodiments, indicate the timing of the respective money transfers. In another example, the time of the flight associated with the flight data object 427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 108 may be searched using a search interface 450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data in a more analytically useful way. Graphical user interfaces allow the user to visualize otherwise obscure relationships and patterns between different data objects. The present disclosure allows for greater scalability by allowing greater access and search capabilities regardless of size. Without using the present disclosure, observation and use of such relationships would be virtually impossible given the size and diversity of many users' present databases, (e.g. excel spreadsheets, emails, and word documents).

Figure 5:
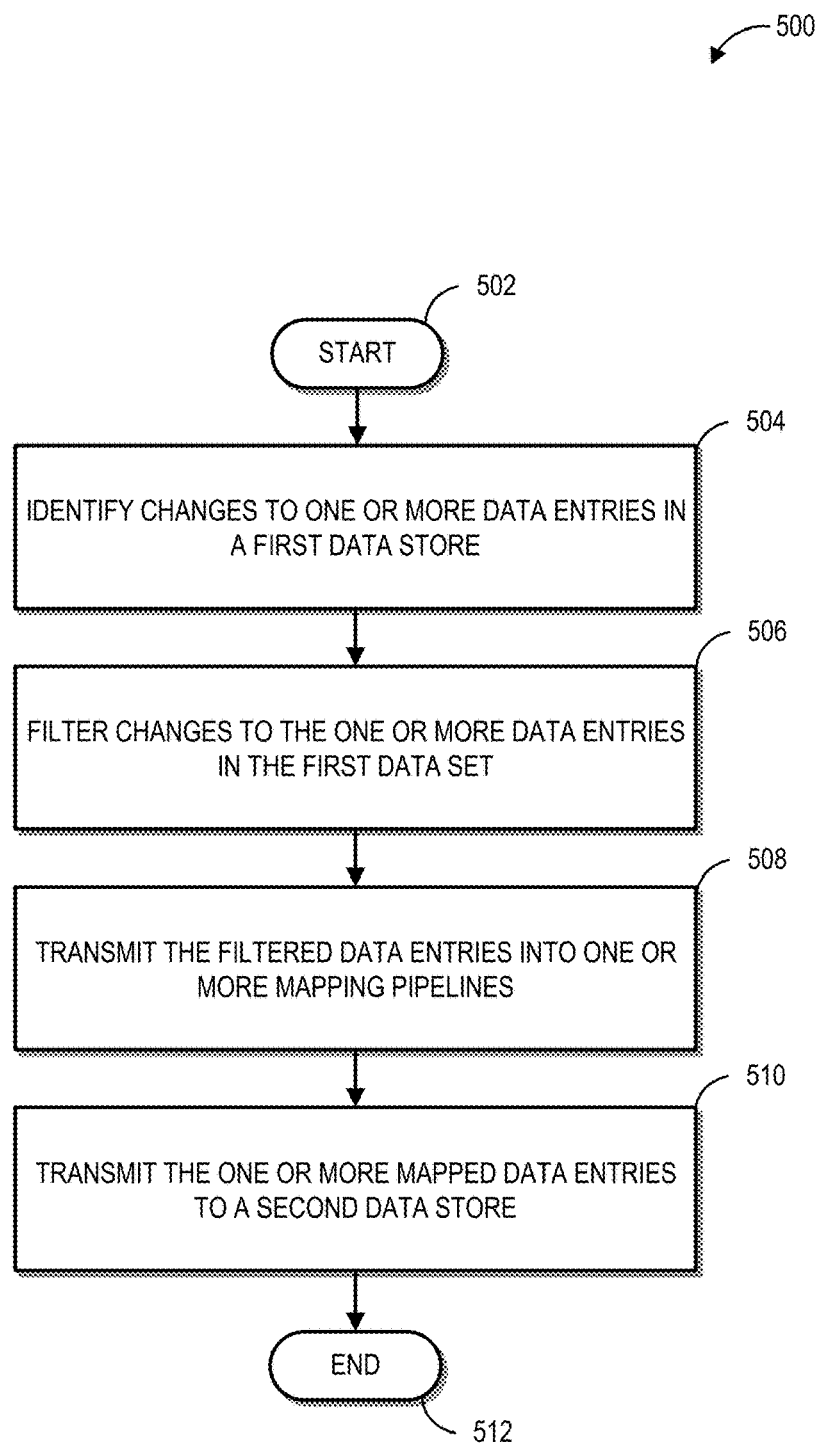
FIG. 5 is an example process for data propagation and mapping from the system point of view.

FIG. 5 is an example process for data propagation and mapping from the system point of view. The process begins at block 502. At block 504, the system 500 may identify changes to one or more data entries in a first data store. In some embodiments, identifying may comprise monitoring an entire data set for data entries storing changed information. In other embodiments, the system 500 may instead monitor only specific, previously determined data entries in a data set. In some embodiments, the system 500 may identify changes to one or more data entries in a first data store by issuing a polling request to the first data store. The first data store may respond to the polling request by transmitting a polling update identifying all data entries storing changed information since the last polling request. In some embodiments, the first data store may keep track of which data entries stored changed information using a variety of methods such as using an input bit or data entry property indicating that the stored information has been altered since the last polling update. In some embodiments, the identifying step may also comprise identifying databases, programs, or applications to transmit data to at the end of the data propagation and mapping process as well as the one or more recipient's storage format.

In block 506, the system 500 may filter changes to the one or more data entries in the identified first data set. In some embodiments, filtering may be according to data properties or characteristics. For example, system 500 may filter a data set for data entries of a specific type (e.g., only look for people data entries) or according to an object identifier, index, or other data property or characteristic. In some embodiments, the filtering step may be advantageously executed prior to the identifying step to reduce the amount of data entries to transfer from the first database to the system, thereby reducing storage demands on the computing system. In some embodiments, filtering according to a data property or characteristic may be executed incrementally such that a filter based on a second data property is executed after a filter based on a first data property.

In block 508, the filtered subset of data entries may be transmitted to a mapping pipeline. The mapping pipeline may comprise a number of blocks configured to execute the overall mapping process. For example, in some embodiments a receiving block may receive a data entry represented in a first storage format, a transformation or conversion block may identify properties in the data entry that are not found in the second storage format; strip the property from the data entry, and structure the data to match the second storage format, and an output block may output the data entry in the second storage format. The mapping pipeline will be discussed in further detail in FIG. 6.

After the filtered data entries are funneled through the mapping pipeline in block 508, the system 500 may transmit the one or more mapped data entries to a second data store in block 510. In some embodiments, the system 500 may transmit the one or more data entries to the recipient databases, programs, or applications previously identified in block 504. The process ends in block 512.

Figure 6:
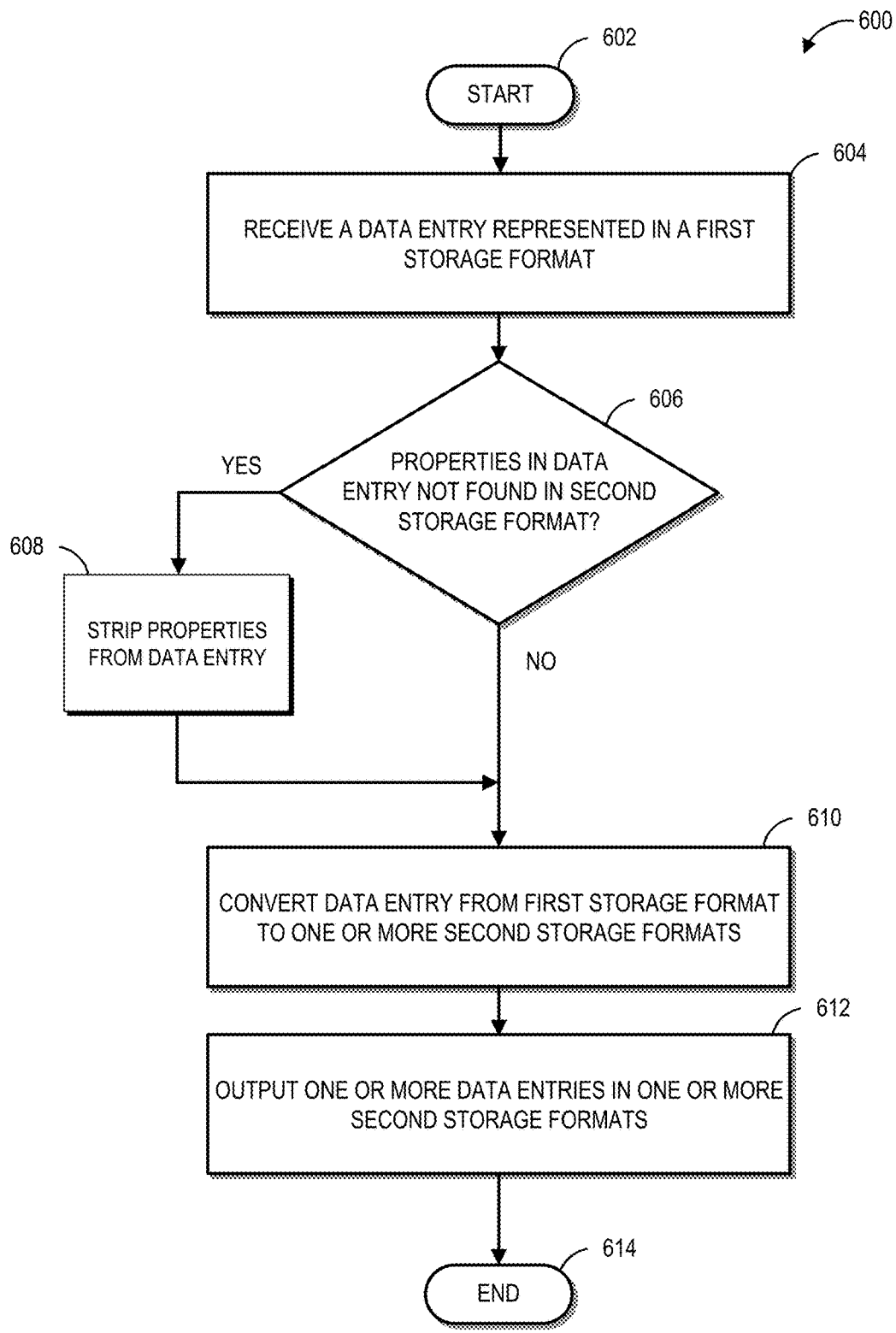
FIG. 6 is a flow chart illustrating an example process for the mapping pipeline.

FIG. 6 is a flow chart illustrating an example process for the mapping pipeline. The mapping pipeline begins the process 600 at block 602. In block 604, the mapping pipeline 600 may receive a data entry represented in a first storage format. In some embodiments, the mapping pipeline may be configured to receive more than one data entry simultaneously. In some embodiments, the mapping pipeline may be split into multiple steps or blocks configured to execute a specific portion of the mapping pipeline. For example, the mapping pipeline may have a dedicated receiving block configured to receive data entries in a first storage format.

The process may proceed to block 606 to determine whether the received data entry includes data properties not found in the second storage format. If the data entry has a property or characteristic not found or tracked in the second storage format, then the process proceeds to block 608 to strip the property or characteristic. For example, the first storage format may store people data objects with corresponding properties relating to age, citizenship, marital status, or last name, and the second storage format may also store people data entries but only track the person's last name and age. In this particular example, the mapping pipeline may then strip the citizenship and marital status data properties from the data entry. If all the properties or characteristics of the data entry are represented in the second storage format, then the mapping pipeline may leave the data entry and corresponding properties unaltered.

At block 610, the mapping pipeline may convert the data entry from a first storage format to a second storage format. In some embodiments, the converting process may comprise generating a new, blank data entry according to the second storage format and populating information from the received data entry into the new data entry format. In other embodiments, the conversion may be according to other methods. The process may proceed to block 612 and output the result of the conversion as a mapped data entry. In some embodiments, the mapping pipeline process may be linear wherein the mapping pipeline will only receive a data entry in one storage format and output one data entry in a second storage format. However, in other embodiments, the mapping pipeline may be non-linear. For example, the mapping pipeline may receive one data entry stored in a first storage format and output one data entry in a second storage format and another data entry in a third storage format. In such embodiments, the mapping pipeline may receive a data object from a first database and output two or more data objects to be included in a second database. For example, where the second database stores information in multiple formats (e.g., plain text, tabular entries in a table, image files, etc.) the mapping pipeline may receive a data entry stored in a plain text format, output a data entry in a tabular format and a data entry in an image file format (e.g., JPEG, TIFF, GIF, etc.), and transmit both outputs to the second database. The process ends at block 614. Although the embodiment of the mapping pipeline described in FIG. 6 represents only one mapping pipeline, the data propagation and mapping system is not limited to using only one mapping pipeline. In some embodiments, an example system may pass data entries through multiple mapping pipelines in a chain to iterate multiple changes throughout the entire pipeline. By way of example, a first mapping pipeline may receive a data entry stored as a Portable Document Format (PDF) file and output a data entry stored in a plain text file format. A second mapping pipeline may then receive the plain text output from the first mapping pipeline, transform the sequence of character codes from the plain text file into an organized table, and output the tabular entry to be included in the second database.

Figure 7A:
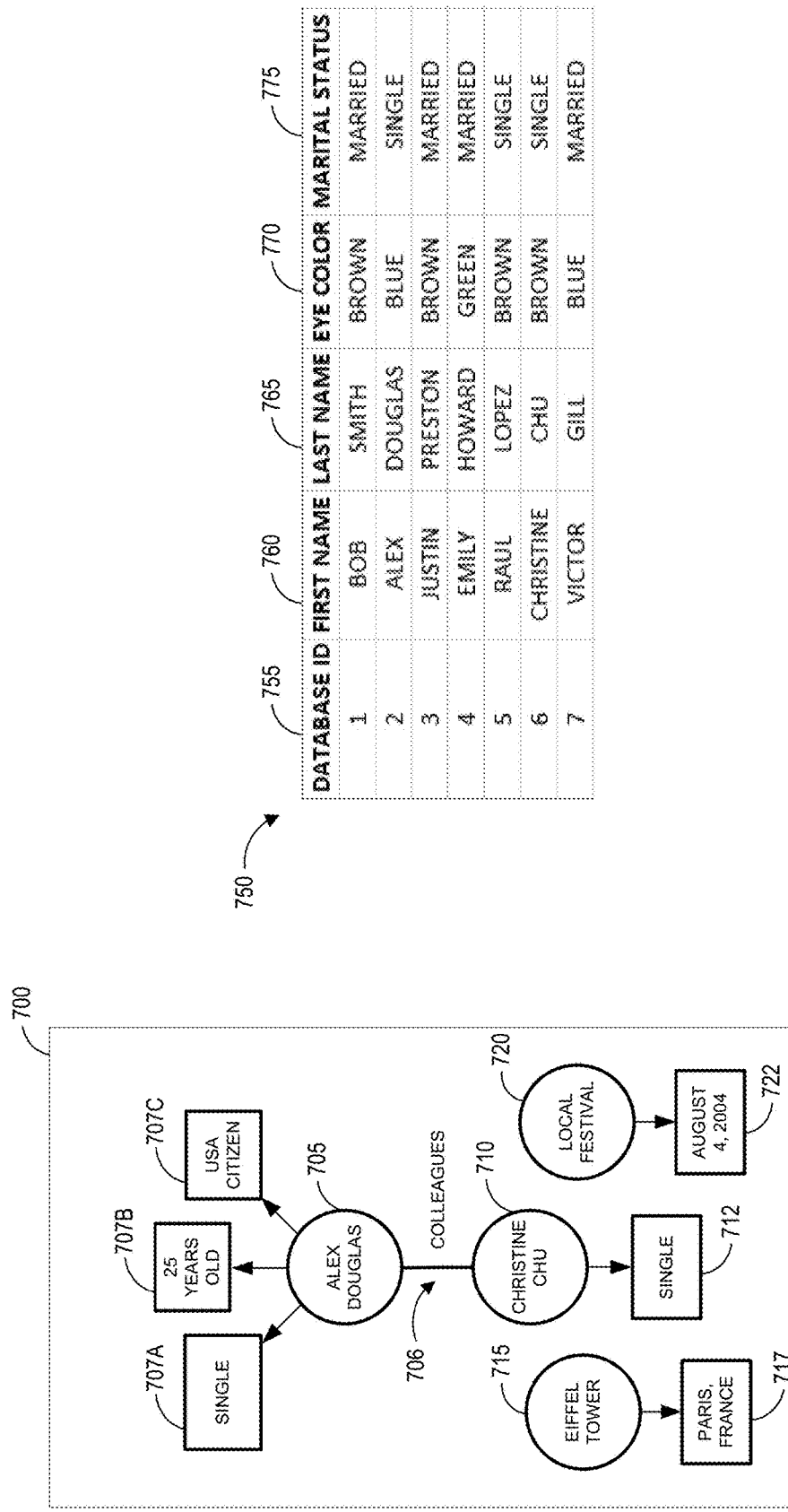
FIG. 7A illustrates two example databases storing different types of data in different storage formats before any changes occur.

FIG. 7A illustrates two example databases storing different types of data in different storage formats before any changes occur. In the example presented in FIG. 7A, database 700 stores data objects 705, 710, 715, and 720. Data objects 705, 710, 715, and 720 may not necessarily store the same type of information. For example, data objects 705 and 710 store information relating to people, data object 715 stores information related to a landmark, and data object 720 stores information related to an event. Each data object may be associated with a plurality of data object properties or characteristics. For example, data object 705 representing "Alex Douglas" is associated with marital status property 707A, age property 707B, and citizenship property 707C. Different data objects may be associated with different types and numbers of data properties. By way of example, while data object 705 is associated with data properties 707A, 707B, and 707C, data object 715 is only associated with location property 717. Similarly, data object 720 is only associated with date property 722. While data object 710 stores the same type of information as data object 705, data object 710 is only associated with the marital status property 712. Data objects 705 and 710 are connected by link 706 representing a particular relationship between data objects 705 and 710. In the particular example in FIGS. 7A-C, link 706 represents that the people represented by data objects 705 and 710 are business colleagues. Unlike database 700, database 750 only stores data entries related to people. Furthermore, database 750 organizes the people data entries as tabular entries in a spreadsheet format. Database 750 comprises data properties 755, 760, 765, 770, and 775 which are represented as separate columns in the spreadsheet format. Each data entry in database 750 will contain a value for properties 755, 760, 765, 770, and 775.

Figure 7B:
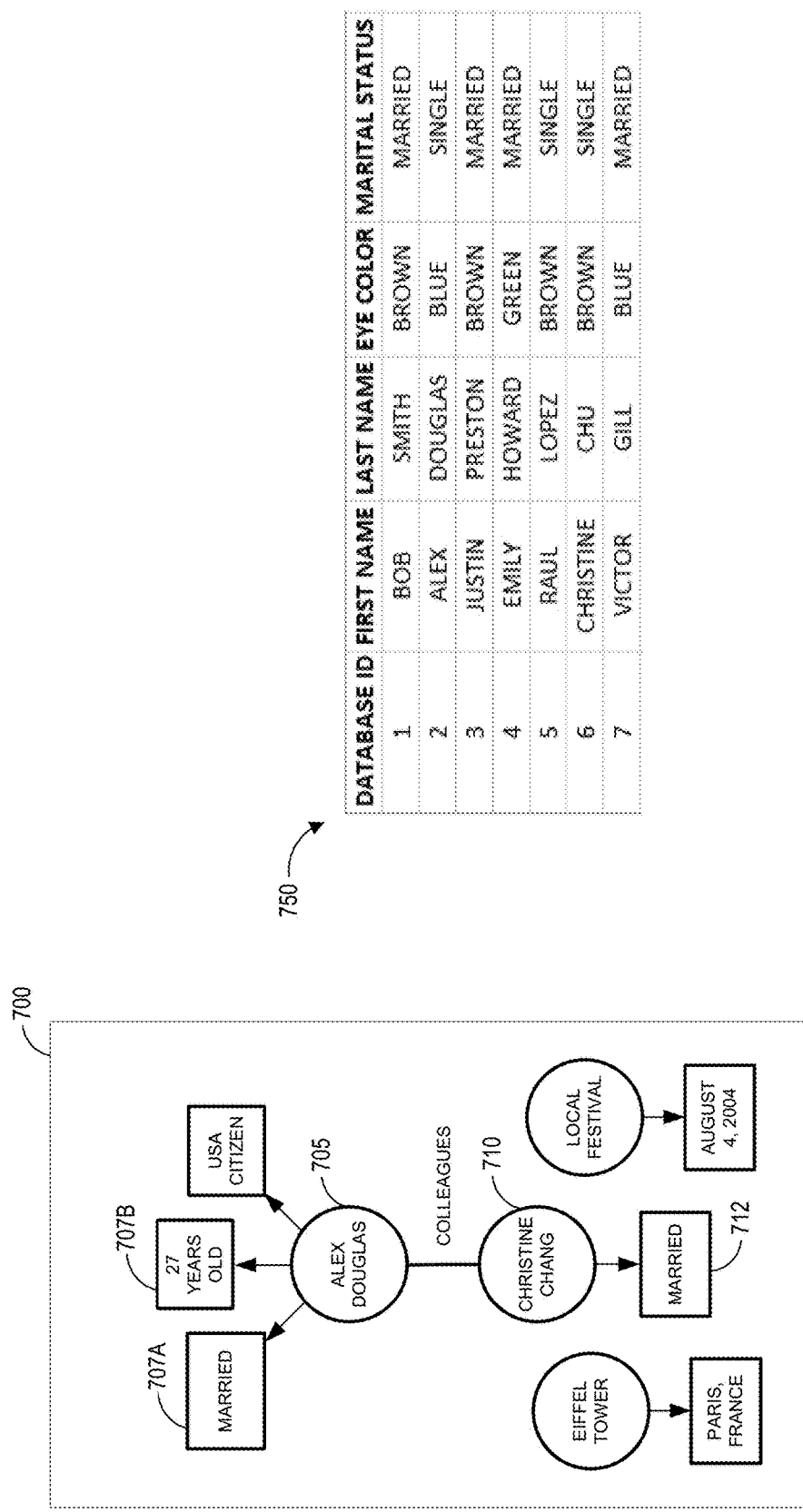
FIG. 7B illustrates two example databases storing different types of data in different storage formats where one database stores changed information.

FIG. 7B illustrates two example databases storing different types of data in different storage formats where one database stores changed information. The information stored in database 700 has changed from the example presented in FIG. 7A. Specifically, data object 710 now reflects a name change from "Christine Chu" to "Christine Chang," and marital status property 712 has changed from "single" to "married." Additionally, though data object 705 still stores "Alex Douglas," data properties 707A and 707B have changed. Specifically, marital status 707A has changed from "single" to "married" and age property 707B has changed from "25 years old" to "27 years old." Because FIG. 7B represents the state of the two databases before data propagation and mapping, the various changes to the data objects and properties stored in database 700 are not reflected in database 750.

Figure 7C:
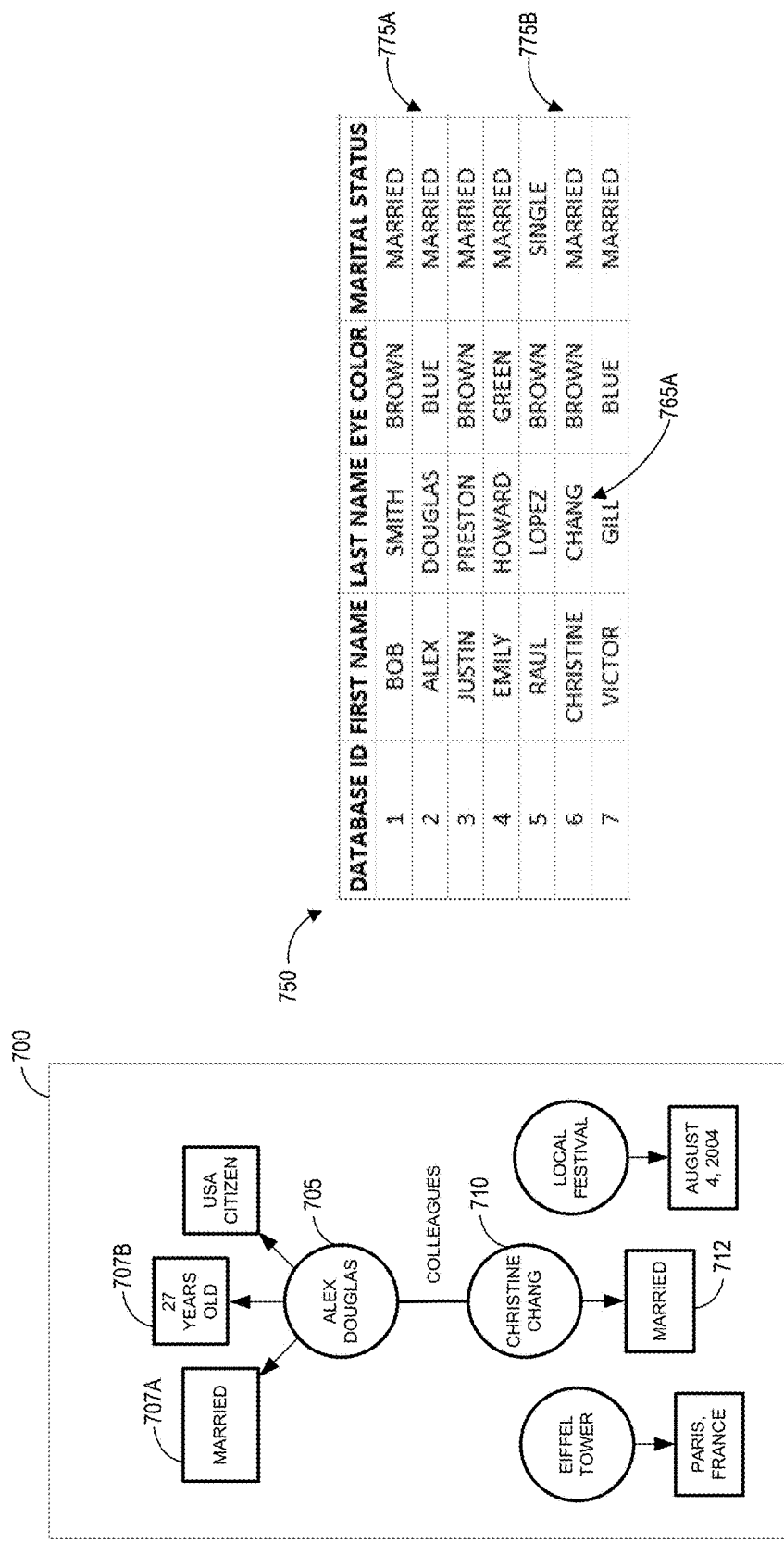
FIG. 7C illustrates two example databases storing different types of data in different storage formats where the changed information in a first database is propagated to a second database.

FIG. 7C illustrates two example databases storing different types of data in different storage formats where the changed information in a first database is propagated to a second database. As a result, last name property 765A is updated to reflect the name change in data object 710. Similarly, marital status properties 775A and 775B are changed from "single" to "married" to reflect the changes to properties 707A and 712. Although the example represented in FIGS. 7A, B, and C assumes data propagation and mapping from database 700 to database 724, other embodiments may instead execute data propagation and mapping from database 724 to database 700.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module,"

"application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
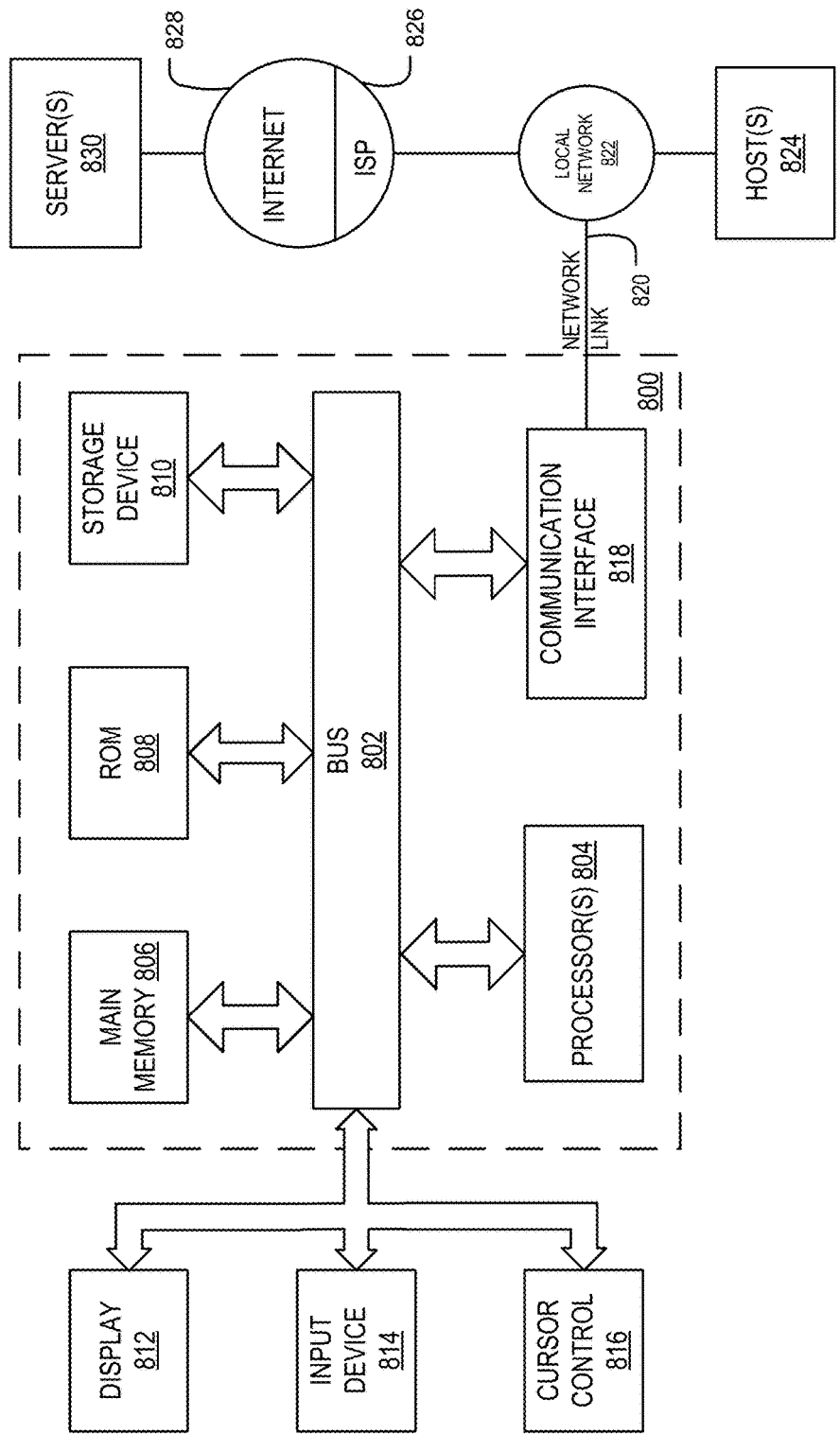
FIG. 8 is a block diagram of an example computing system configured to perform data propagation and mapping.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information such as data entries from one or more data stores. Hardware processor(s) 804 may be, for example, one or more general purpose microprocessors configured to execute data propagation and mapping instructions.

Computer system 800 also includes a main memory 806, such as a random access memory (RAM), cache and/or other dynamic storage devices, coupled to bus 802 for storing data entries and instructions to be executed by processor 804. Main memory 806 also may be used for storing temporary variables or other intermediate information during execution of data propagation and mapping instructions to be executed by processor 804. Such instructions, when stored in storage media accessible to processor 804, render computer system 800 into a special-purpose machine that is customized to perform the operations specified in the data mapping and propagation instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and data propagation and mapping instructions.

Computer system 800 may be coupled via bus 802 to a display 812, such as a cathode ray tube (CRT) or LCD display (or touch screen), for displaying graphical user interfaces or data entry information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the identifying, filtering, mapping, and transmitting techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the identifying, filtering, mapping, and transmitting process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information. In some embodiments, communication interface 818 may allow computing system 800 to receive and transmit data entry information from one or more data stores.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In some embodiments, computing system 800 may receive and transmit data entry or data set information from one or more databases across network link 820.

The received code may be executed by processor 804 as it is received, and/or stored in storage device 810, or other non-volatile storage for later execution. The received data entry or data set information may be stored in storage device 810 and manipulated, analyzed, or processed by processor 804 according to data propagation and mapping instructions stored in or received by computing system 800.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
a first non-transitory computer storage medium configured to store a data set representable in a first storage format, wherein the first storage format comprises information stored as one or more data objects having one or more data object properties, wherein the one or more data objects are linked together with one or more links according to an ontology defined by one or more data object types;
a second non-transitory computer storage medium configured to store a data set representable in a second storage format, wherein the second storage format comprises information stored as tabular entries in a table;
a third non-transitory computer storage medium configured to at least store computer-executable instructions; and
one or more computer hardware processors in communication with the third non-transitory computer storage medium, the one or more computer hardware processors configured to execute the computer-executable instructions to at least:
   identify, in the first non-transitory computer storage medium, one or more data entries storing changed information in the data set represented in the first storage format;
   filter the one or more identified data entries in the first non-transitory computer storage medium to generate a subset of filtered data entries; and
   subsequent to said filtering, transmit the subset of filtered data entries to a pipeline configured to:
      automatically identify one or more data object properties of each data object in the subset of filtered data entries that are not found in the second storage format;
      strip the identified one or more data object properties of each filtered data entry to generate stripped data entries;
      convert the stripped data entries represented as linked data objects to data entries represented as a series of tabulated entries; and
      transmit the converted data entries to the second non-transitory computer storage medium.

2. The system of claim 1, wherein the one or more data object links represent a particular relationship between a first data object and a second data object.

3. The system of claim 1, wherein the one or more computer hardware processors is configured to identify one or more data entries storing changed information in a data set according to receiving polling updates of all data entries storing changed information in a database.

4. The system of claim 1, wherein the one or more computer hardware processors is further configured to identify one or more data entries storing changed information in all data sets in the first non-transitory computer storage medium.

5. The system of claim 1, wherein the one or more computer hardware processors is further configured to filter the one or more data entries in a data set according to a data object property or characteristic.

6. The system of claim 5, wherein the filtering according to a data object property or characteristic is executed incrementally such that a filter based on a second data object property is executed after a filter based on a first data object property.

7. The system of claim 1, wherein the pipeline is further configured to map a data entry in the second storage format to the first storage format.

8. The system of claim 1, wherein the pipeline executes non-linear mapping such that one data entry stored in the first storage format is mapped to at least two or more storage formats.

9. A computer-implemented method comprising:
   under control of one or more processors,
      identifying, in a first non-transitory computer storage medium configured to store a data set representable in a first storage format, one or more data objects storing changed information, wherein the first storage format comprises information stored as one or more data objects having one or more data object properties, wherein the one or more data objects are linked together with one or more links according to an ontology defined by one or more data object types;
   filtering the one or more identified data objects in the first non-transitory computer storage medium to generate a subset of filtered data objects; and
   subsequent to said filtering, for each filtered data object in the subset, transmitting the filtered data object to a pipeline configured to:
      automatically identify one or more data object properties of the filtered data object that are not found in a second storage format;
      strip the identified one or more data object properties from the filtered data object to generate a stripped data object;
      map the stripped data object in the first storage format to a data entry in the second storage format; and
      transmit the mapped data entry to a second non-transitory computer storage medium configured to store a data set representable in the second storage format, wherein the second storage format comprises information stored as tabular entries in a table.

10. The method of claim 9, wherein the one or more links represent a particular relationship between a first data object and a second data object.

11. The method of claim 9, wherein identifying the one or more data objects storing changed information in a data set is according to receiving polling updates of all data objects storing changed information in a database.

12. The method of claim 9, wherein identifying one or more data objects storing changed information comprises identifying the one or mroe data objects storing changed information in all data sets in the first non-transitory computer storage medium.

13. The method of claim 9, wherein filtering the one or more identified data objects in a data set according to a data object property or characteristic.

14. The method of claim 13, wherein filtering the one or more identified data objects according to a data object property or characteristic is executed incrementally such that a filter based on a second data property is executed after a filter based on a first data object property.

15. The method of claim 9, wherein the pipeline is further configured to map a data object in the second storage format to the first storage format.

16. The method of claim 9, wherein the pipeline executes non-linear mapping such that one data object stored in the first storage format is mapped to at least two or more storage formats.

* * * * *